United States Patent
Grabarz et al.

(10) Patent No.: US 8,231,113 B2
(45) Date of Patent: Jul. 31, 2012

(54) GAS SPRING ASSEMBLY AND SPACER

(75) Inventors: Andrew Grabarz, Cicero, IN (US);
Stephen C. Street, Carmel, IN (US);
Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 1091 days.

(21) Appl. No.: 12/133,578

(22) Filed: Jun. 5, 2008

(65) Prior Publication Data
US 2009/0302514 A1 Dec. 10, 2009

(51) Int. Cl.
*F16F 9/04* (2006.01)
(52) U.S. Cl. .............. 267/64.27; 267/64.23; 267/122; 267/124
(58) Field of Classification Search ............ 267/64.27, 267/64.23, 64.19, 64.21, 122, 124; 280/5.507, 280/124.157
See application file for complete search history.

(56) References Cited

U.S. PATENT DOCUMENTS

| | | | | |
|---|---|---|---|---|
| 3,876,193 | A * | 4/1975 | Clary | 267/64.16 |
| 4,506,910 | A | 3/1985 | Bierens | |
| 4,890,823 | A * | 1/1990 | Koschinat et al. | 267/64.27 |
| 5,342,139 | A | 8/1994 | Hoffman | |
| 5,535,994 | A * | 7/1996 | Safreed, Jr. | 267/64.27 |
| 6,024,343 | A * | 2/2000 | Ebert | 267/64.27 |
| 6,234,460 | B1 | 5/2001 | Arnold | |
| 6,250,613 | B1 * | 6/2001 | Koeske et al. | 267/66 |
| 6,386,524 | B1 * | 5/2002 | Levy et al. | 267/64.27 |
| 6,527,259 | B1 | 3/2003 | Nemeth et al. | |
| 6,752,407 | B2 | 6/2004 | Warinner | |
| 6,945,548 | B2 | 9/2005 | Dudding et al. | |
| 7,328,887 | B2 * | 2/2008 | Leonard | 267/122 |
| 7,475,893 | B2 * | 1/2009 | Chamberlin et al. | 280/124.116 |
| 2006/0055094 | A1 | 3/2006 | Attinello et al. | |
| 2006/0181145 | A1 | 8/2006 | Stuani | |
| 2006/0220283 | A1 | 10/2006 | Leonard | |
| 2006/0226586 | A1 | 10/2006 | Levy | |
| 2007/0114706 | A1 | 5/2007 | Myers | |
| 2008/0211150 | A1 * | 9/2008 | Levy et al. | 267/64.27 |
| 2009/0065989 | A1 * | 3/2009 | Leonard | 267/64.27 |
| 2009/0200717 | A1 * | 8/2009 | Rebernik et al. | 267/64.24 |

FOREIGN PATENT DOCUMENTS

| | | |
|---|---|---|
| EP | 0 296 445 | 12/1988 |
| EP | 1 300 264 | 4/2003 |
| EP | 2 034 210 A2 | 3/2009 |
| EP | 2 088 009 A2 | 8/2009 |
| WO | WO 00/70238 | 11/2000 |

OTHER PUBLICATIONS

European Search Report, dated Aug. 1, 2011, in connection with European Appln. No. 09758973.3, filed May 18, 2009.

* cited by examiner

*Primary Examiner* — Robert A Siconolfi
*Assistant Examiner* — Mariano Sy
(74) *Attorney, Agent, or Firm* — Jason A. Houser; Fay Sharpe LLP

(57) ABSTRACT

A cooperative mounting arrangement for an end member or spacer of a gas spring assembly includes a recess formed into one of the end member and the spacer. A projection is provided on or along an associated structural component. The recess receives the projection such that lateral forces acting on the end member of the gas spring assembly can be transferred to the associated structural component.

20 Claims, 10 Drawing Sheets

GAS SPRING ASSEMBLY AND SPACER

BACKGROUND

The subject matter of the present disclosure broadly relates to the art of gas spring devices and, more particularly, to an arrangement for interconnecting a gas spring assembly and an associated support structure such that laterally-acting loads can be transferred therebetween.

The subject matter of the present disclosure finds particular application and use in conjunction with suspension systems of wheeled vehicles, and will be shown and described herein with particular reference thereto. However, it is to be appreciated that the present exemplary embodiments are also amenable to use in other applications and environments. For example, the subject matter of the present disclosure could be used in operative association with structural supports, height adjusting systems and/or actuators associated with industrial machinery, components thereof and/or other such equipment on which lateral load conditions may be encountered. Accordingly, the subject matter of the present disclosure is not intended to be limited to use associated with vehicle suspensions and it is to be understood that the embodiments shown and described herein are merely exemplary.

Gas spring assemblies of various kinds and constructions are well known and commonly used in vehicle suspension systems, industrial machinery as well as other equipment and devices to provide dynamic load support between sprung and unsprung masses associated therewith. A typical gas spring assembly includes two opposing end members with a flexible wall or sleeve secured between the two end members that at least partially defines a spring chamber. A quantity of pressurized gas, usually air, is contained within the spring chamber and acts on the spaced end members as well as opposing portions of the flexible wall to support the load of the sprung mass or a force that is otherwise applied to the gas spring assembly.

It is commonly understood that gas spring assemblies are well suited for supporting loads acting axially (i.e., longitudinally between the opposed end members thereof), but that only a minimal lateral load, if any, can be supported by a typical gas spring assembly. Thus, applications that are normally identified as being well suited for the use of gas spring assemblies primarily involve the transfer of axially applied loads. As a result, there is a considerable body of art that is directed to arrangements for securing the gas spring assembly to a corresponding structural member in a way that provides sufficient axial support. Such arrangements commonly include the use of threaded fasteners, fixed mounting studs with threaded nuts and/or snap together-type connections.

It has been recognized, however, that in some applications the action of the gas spring assembly itself can generate lateral load conditions on one or more of the end members thereof. For example, in an application in which one end member is disposed at and/or moved through an angle relative to the other end member, the flexible wall is urged outwardly toward the open end of the included angle between the end members. This action can generate a lateral load acting on one or both of the end members. Unfortunately, many known securement arrangements, having been designed to withstand axially-applied loads, as discussed above, are less well suited for use under lateral or shear loads. Therefore, a need exists for an improved arrangement for engaging an end member of a gas spring assembly with a corresponding structural member such that the interface can withstand the aforementioned lateral load conditions, such as may be encountered by a vehicle suspension system, for example.

Various arrangements have been proposed to overcome the above-described difficulties. One example of such an arrangement is shown in U.S. Pat. No. 5,342,139, which discloses an attachment device for mounting an end member of an air spring assembly on a corresponding support component. Another example of such an arrangement is shown in U.S. Pat. No. 6,752,407, which discloses a multi-component and mounting plate arrangement for securing an air spring along a structural component. Still another example of such an arrangement is shown in U.S. Pat. No. 6,945,548, which discloses a spacer that is adapted to engage the air spring assembly and includes a winged portion that engages a slot in the corresponding structural component. Yet another example of such an arrangement is shown in U.S. Patent Application Publication No. 2006/0055094, which discloses an air spring with end members having snap-in attachments for engaging the corresponding structural members.

While the above-described arrangements have met with some degree of success, numerous difficulties and/or disadvantages have been identified with the same, which have undesirably impacted the widespread adoption and use of the same. Such difficulties and/or disadvantages include the use of additional components, such as extra fasteners, retention pins, mounting brackets and/or other components, which undesirably increase inventory and production costs and can also raise installation and maintenance issues. What's more, certain design configurations, such as snap-in type designs, for example, may be insufficiently robust to withstand both the axial and lateral load conditions, particularly those associated with heavy-duty applications. Furthermore, some known arrangements utilize features that extend radially-outwardly beyond the periphery of at least a portion of the gas spring assembly, which can result in space constraints for other components.

Therefore, it is believed desirable to develop an improved mounting arrangement for interconnecting a gas spring assembly and an associated support structure such that laterally-acting loads can be transferred therebetween, such as may be encountered during dynamic operation and use of a vehicle suspension system, for example.

BRIEF DESCRIPTION

A piston in accordance with the subject matter of the present disclosure is provided for use in forming an associated gas spring assembly and that is adapted to engage an associated projection of an associated structural support member is provided that includes a first end, which includes a first end wall adapted to engage an associated flexible sleeve of the associated gas spring assembly. An opposing second end includes a second end wall adapted to abuttingly engage the associated structural support member. The second end is disposed in longitudinally-spaced relation to the first end such that a central axis extends therebetween. An outer side wall extends at least partially between the first and second ends and is suitable for rolling of the associated flexible sleeve therealong. An inner side wall is disposed in radially-inwardly spaced relation to the outer side wall such that a chamber is at least partially defined therebetween. First and second support walls extend from the inner side wall to the outer side wall such that the chamber is at least partially segmented by the first and second support walls. First and second recess walls are positioned between the inner and outer side walls. The first and second recess walls extend between the first and second support walls and are radially spaced from one another to at least partially define a recess that is adapted to receive the associated projection of the associated structural support member such that lateral loads acting on the piston can be transferred to the associated projection.

A gas spring assembly in accordance with the subject matter of the present disclosure is provided that is adapted for use on an associated structural component having an associated projection for opposing laterally-acting loads and includes a first end member. A second end member is spaced from the first end member and is adapted for use in operative association along the associated structural component. A flexible wall is secured between the first and second end members and at least partially defines a spring chamber therebetween. The second end member includes a first end wall and a second end wall disposed in spaced relation to one another such that a central axis is formed therebetween. An axially-extending outer wall includes an outer wall surface for rolling of the flexible wall therealong. An axially-extending inner wall is positioned radially-inwardly from the outer wall such that a cavity is formed therebetween. Two or more radially-extending support walls are connected between the inner and outer walls. A recess wall extends between adjacent ones of the two or more support walls and at least partially defines a recess therebetween that is operative to receive the associated projection and thereby transfer lateral loads acting on the second end member to the associated structural component along which the associated projection is provided.

A spacer in accordance with the subject matter of the present disclosure is provided that is adapted to support an associated end member of an associated gas spring assembly in spaced relation to an associated structural component having an associated projection. The spacer includes a first side adapted to abuttingly interengage the associated end member such that lateral loads acting on the associated end member can be transferred to the spacer. An opposing second side is adapted to abuttingly engage the associated structural component. A recess is accessible from along the second side and is adapted to cooperatively receive the associated projection for transferring laterally-acting loads from the associated end member to the associated structural component.

A gas spring and spacer assembly in accordance with the subject matter of the present disclosure is provided for securement along an associated structural component having an associated projection extending therefrom. The gas spring and spacer assembly includes a first end member and a second end member disposed in longitudinally-spaced relation to the first end member. The second end member includes a first surface facing away from the first end member. A flexible wall is secured between the first and second end members and at least partially defines a spring chamber therebetween. A spacer includes opposing first and second sides and a recess accessible from along the second side. The first side includes a first surface adapted to abuttingly engage the first surface of the second end member. The second side includes a second surface adapted to abuttingly engage the associated structural component. The recess is operative to receive the associated projection and thereby transfer lateral loads acting on the second end member to the associated structural component along which the associated projection is provided.

DETAILED DESCRIPTION

Figure 1:
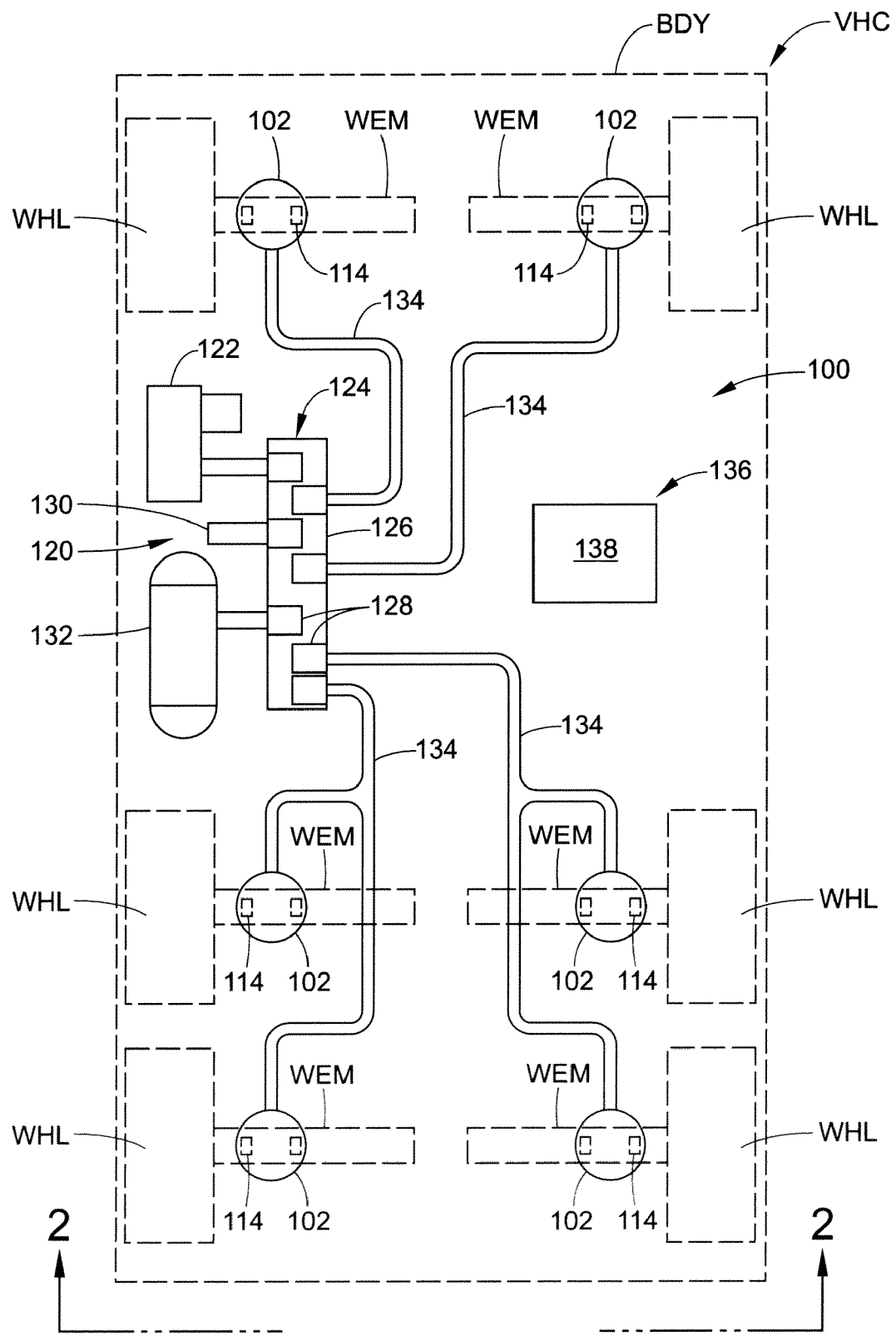
FIG. 1 is a schematic representation of a vehicle that includes gas spring assemblies operatively connected to vehicle structures using cooperative mounting arrangements in accordance with the subject matter of the present disclosure.

Turning now to the drawings, wherein the showings are for the purpose of illustrating examples of the subject matter of the present disclosure and which are not intended as a limitation of the same, FIG. 1 illustrates one embodiment of a suspension system 100 disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies 102, one or more of which is disposed toward each corner of the associated vehicle adjacent a corresponding wheel WHL thereof. However, it will be appreciated that any other suitable number of gas spring assemblies 102 could alternately be used and that such gas spring assemblies can be disposed in any other suitable configuration or arrangement.

As will be shown and discussed in greater detail hereinafter, gas spring assemblies 102 include a first or upper end member, such as a bead plate 104, for example, a second or lower end member, such as piston 106, for example, and a flexible wall, such as an elongated sleeve 108, for example, that is secured therebetween in a substantially fluid-tight manner. Thus, it will be recognized that the gas spring assemblies shown and described herein (e.g., gas spring assemblies 102) are of a rolling lobe-type construction. However, it is to be understood that the subject matter of the present disclosure can be utilized in association with gas spring assemblies of any other type, kind, arrangement, configuration and/or construction.

Figure 2:
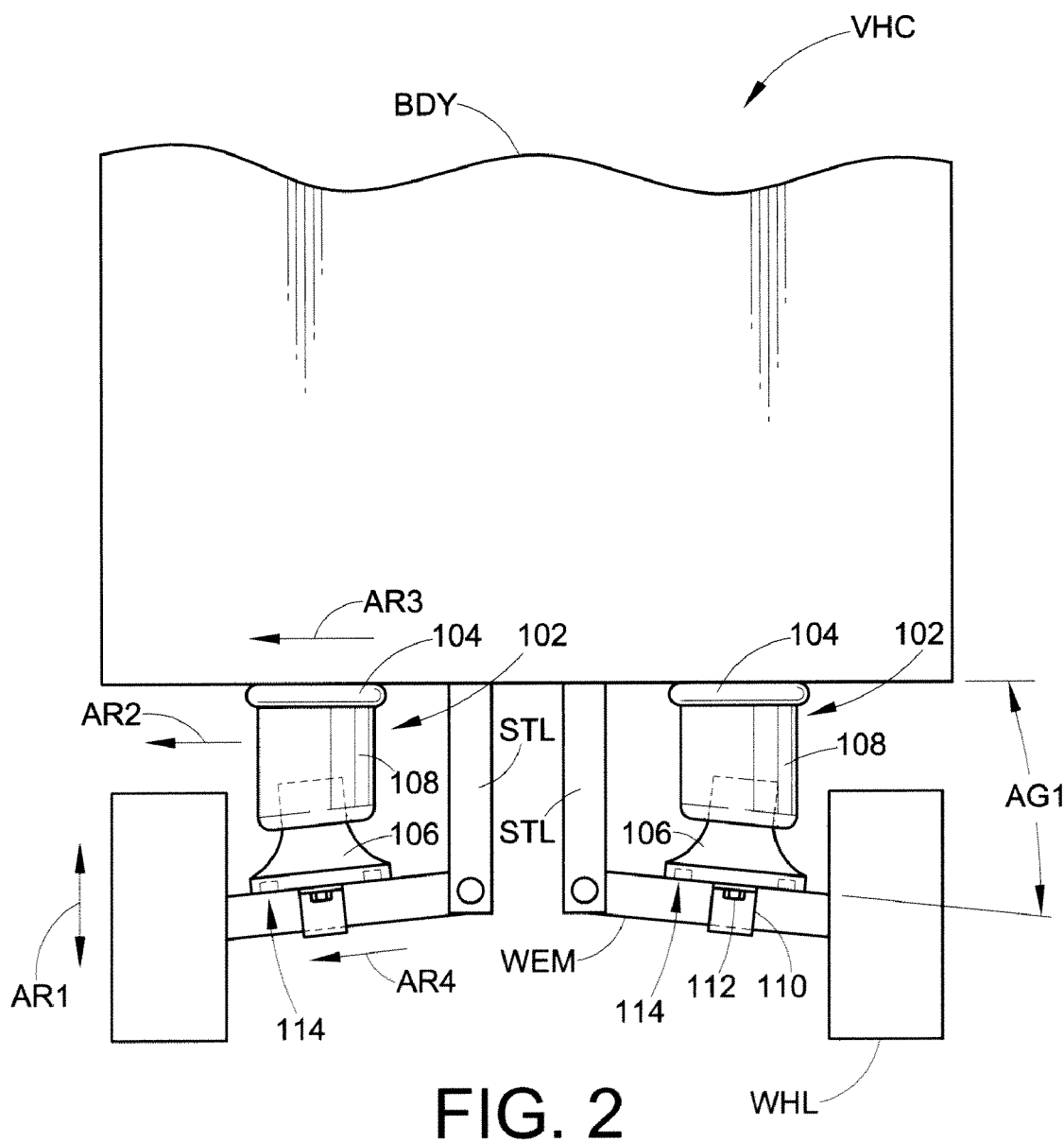
FIG. 2 is a side view of the vehicle in FIG. 1 taken from along line 2-2 thereof.

Furthermore, it will be appreciated that the gas spring assemblies can be operatively connected between the sprung and unsprung masses of an associated vehicle in any suitable manner. For example, gas spring assemblies 102 are shown in FIG. 2 as being operatively connected between wheel-engaging members WEM and body BDY of associated vehicle VHC. It will be appreciated, however, that the configuration of vehicle VHC in FIG. 2 is merely a schematic representation of the structural components of the sprung and unsprung masses of the vehicle. Thus, it will be understood that this schematic representation is provided for purposes of discussion and ease of understanding and is not intended to be in any way limiting.

With further reference to the exemplary arrangement in FIG. 2, wheel-engaging members WEM are shown as being pivotally attached to structural components STL such that the wheel-engaging members move through an angle AG1 relative to body BDY as wheels WHL undergo vertical movements (e.g., jounce and rebound actions), which movements are represented in FIG. 2 by arrow AR1. Thus, it will be recognized that as wheels WHL move vertically away from body BDY (i.e., under a rebound condition), angle AG1 between the body and the corresponding wheel-engaging member will increase and gas spring assembly 102, which is operatively connected therebetween, will become elongated. It will also be recognized that as wheels WHL move vertically toward body BDY (i.e., under a jounce condition), angle AG1 will decrease and gas spring assembly 102 will become compressed. Due, at least in part, to the body and wheel-engaging member acting on the gas spring assembly at an angle to one another, gas spring assembly 102 will normally be pinched, squeezed or otherwise biased toward the open end of angle AG1, as is represented by arrow AR2. This biasing action results in the generation of forces that act laterally on the opposing end members of the gas spring assembly (e.g., bead plate 104 and piston 106), as is indicated by arrows AR3 and AR4, respectively, in FIG. 2. Thus, the biasing action acts to urge the end members of the gas spring assembly in a laterally-outward direction, such as toward wheels WHL, for example.

It is common practice for gas spring assemblies to be secured to the associated sprung and unsprung masses in a manner suitable for withstanding longitudinally (i.e., axially) acting forces or loads. Additionally, it will be appreciated that securement components and/or features of a wide variety of types, kinds, configurations and/or constructions have been used to secure the end members of the gas spring assemblies to the vehicle components in the longitudinal (i.e., axial) direction. In many such known mounting arrangements, one or more fasteners or other securement elements will pass through an opening in the structural component on which the end member is supported to engage the end member and thereby secure the gas spring assembly to the structural component.

Figure 3:
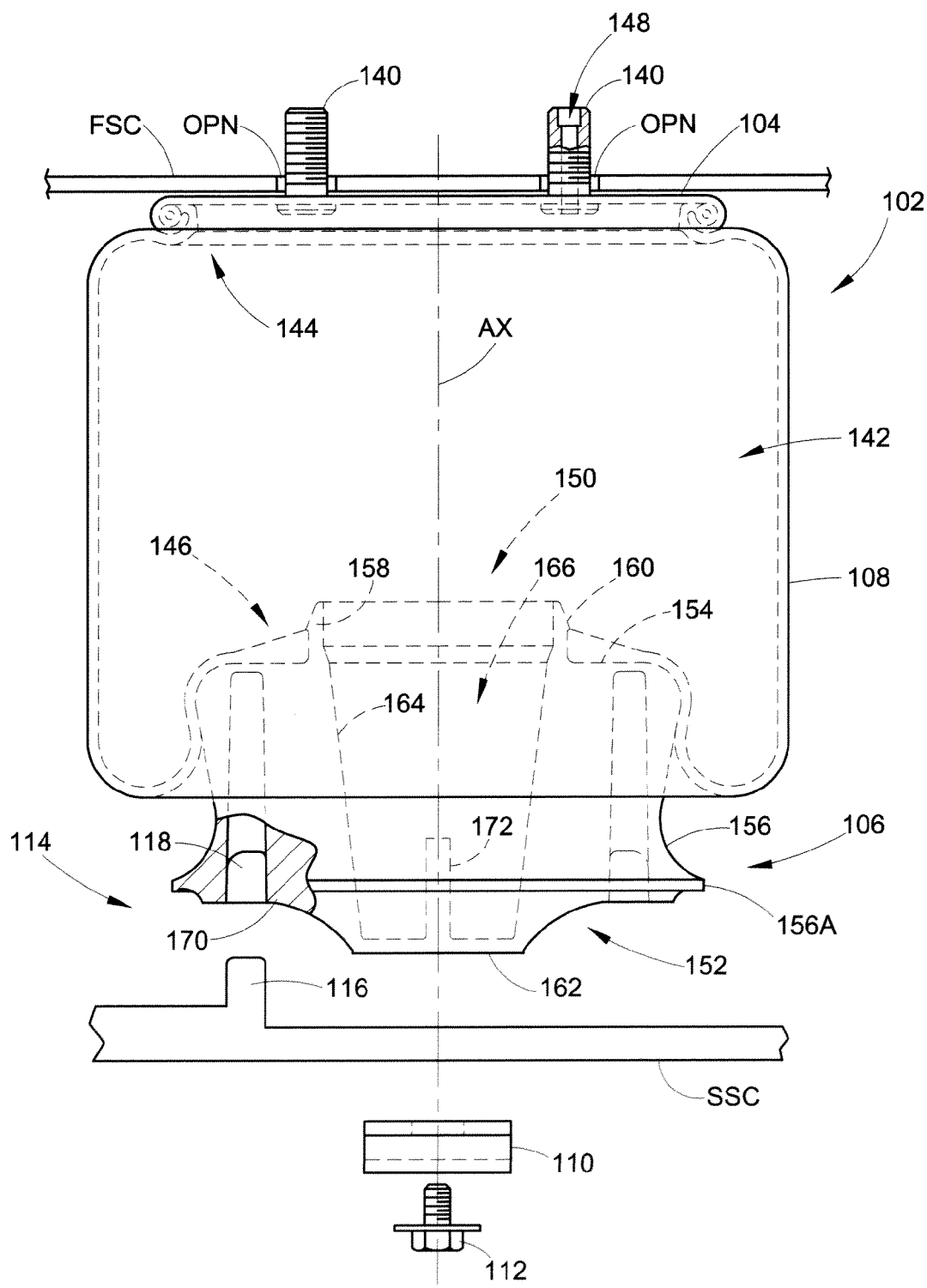
FIG. 3 is an enlarged portion of the side view in FIG. 2 showing in greater detail a gas spring assembly including an exemplary mounting arrangement for cooperative use with an associated vehicle structure.
Figure 4:
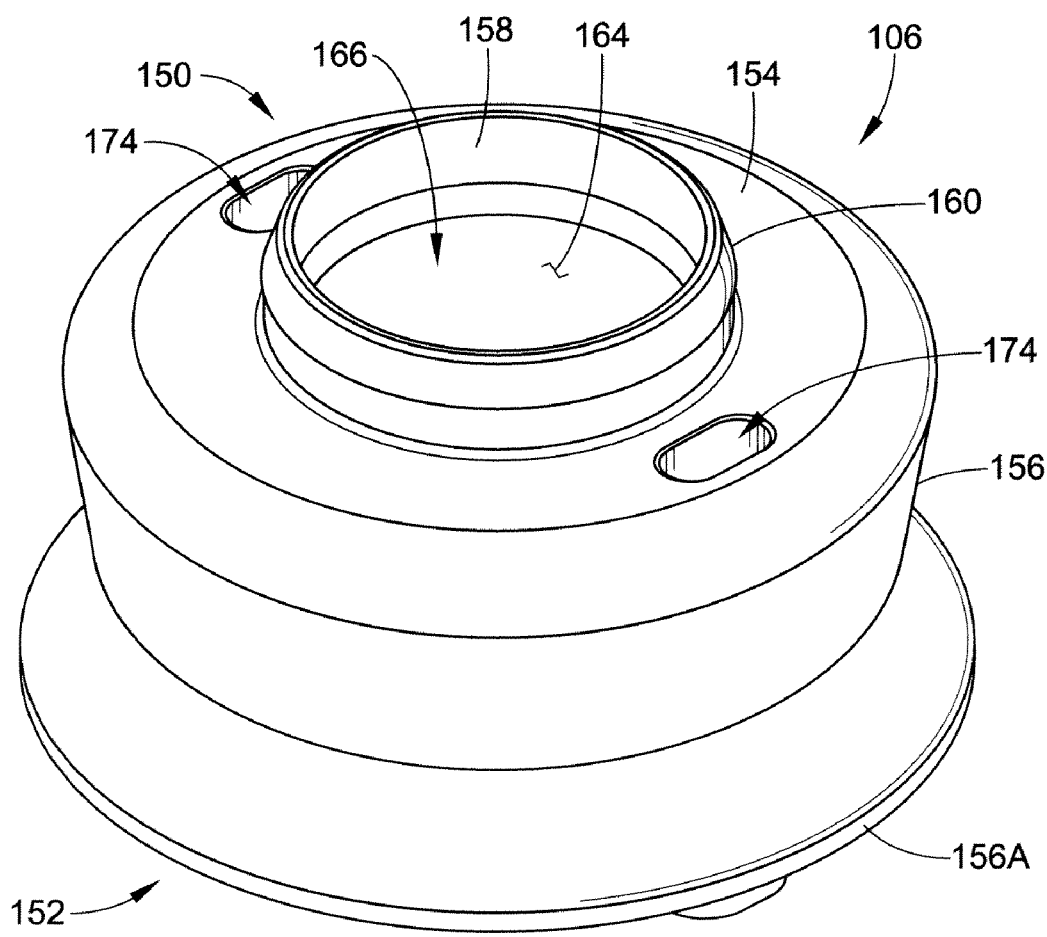
FIG. 4 is top perspective view of an exemplary end member of the gas spring assembly in FIG. 3.
Figure 5:
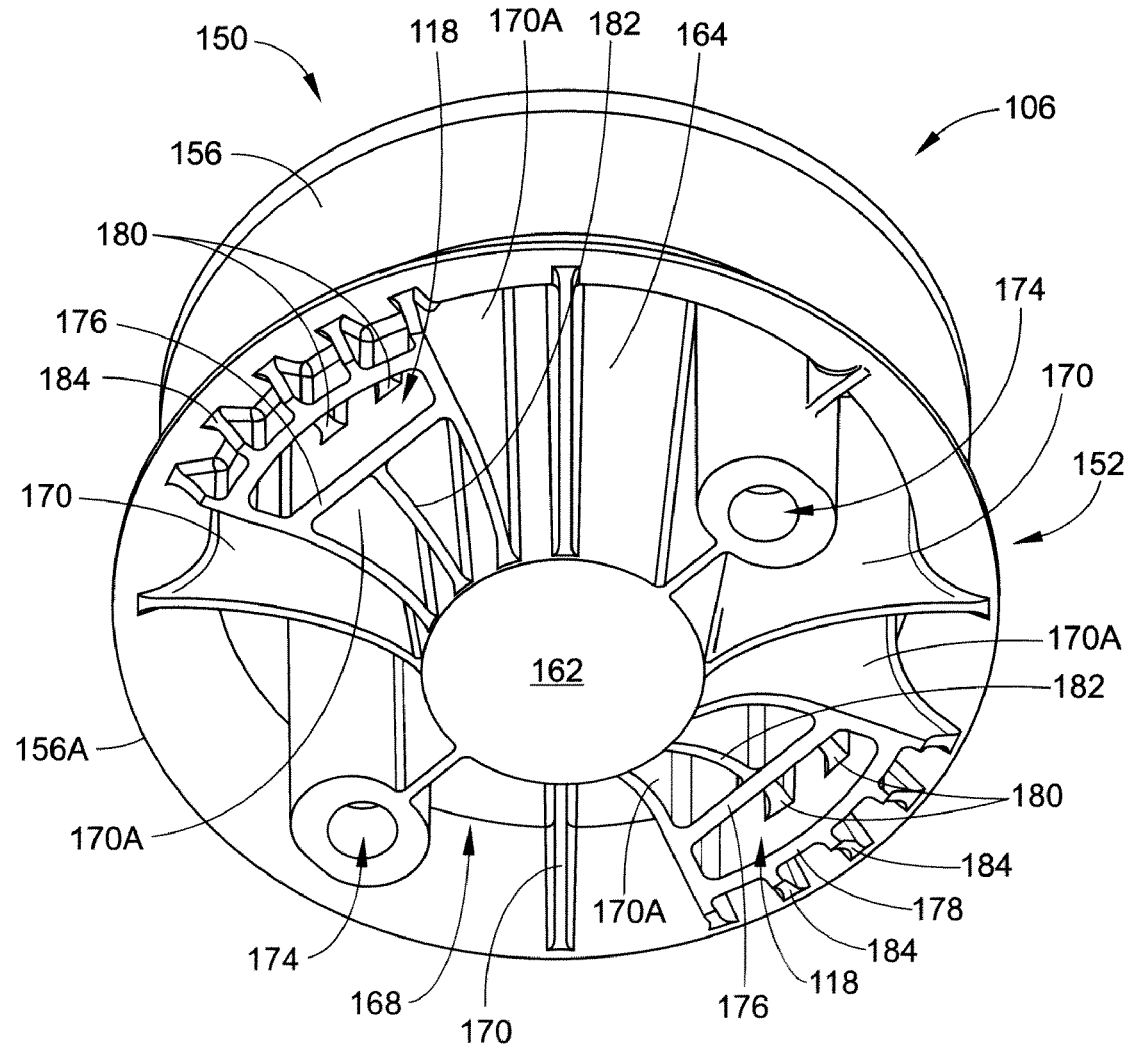
FIG. 5 is a bottom perspective view of the exemplary end member in FIG. 4.
Figure 6:
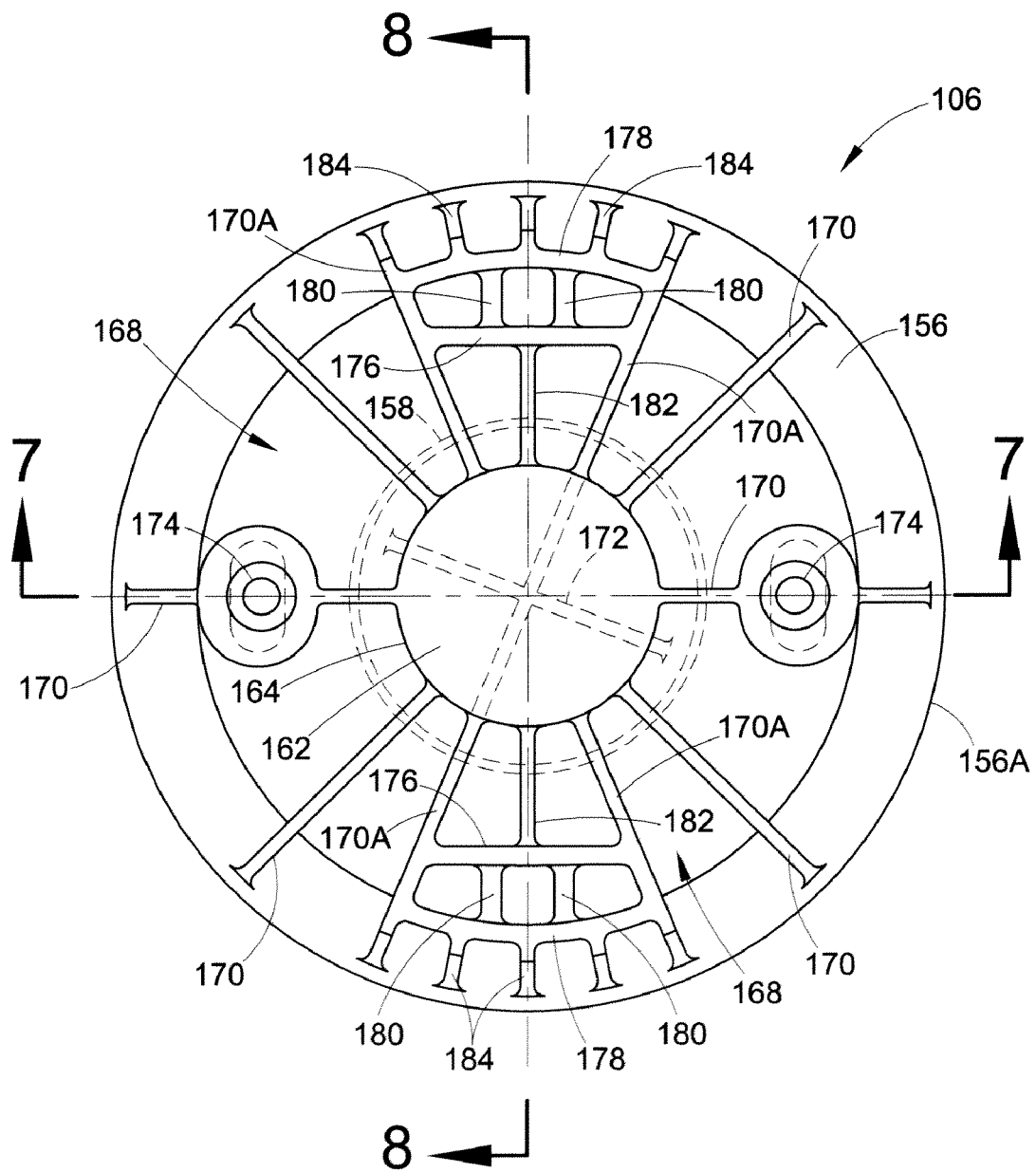
FIG. 6 is a bottom plan view of the exemplary end member in FIGS. 4 and 5.
Figure 7:
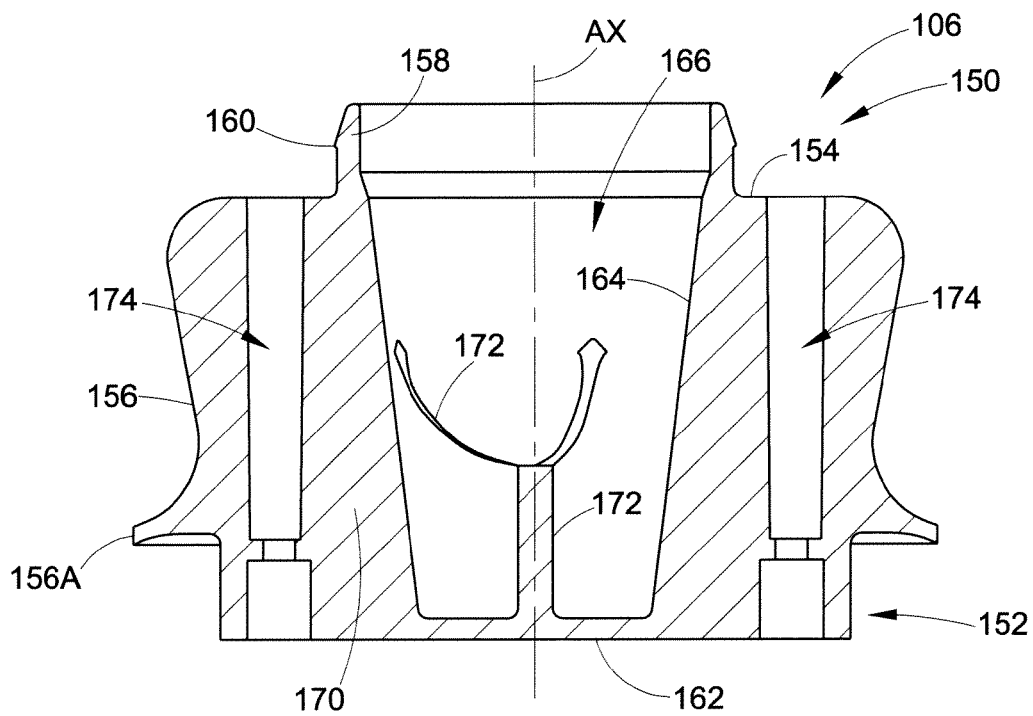
FIG. 7 is a cross-sectional side view of the exemplary end member in FIGS. 4-6 taken from along line 7-7 in FIG. 6.
Figure 8:
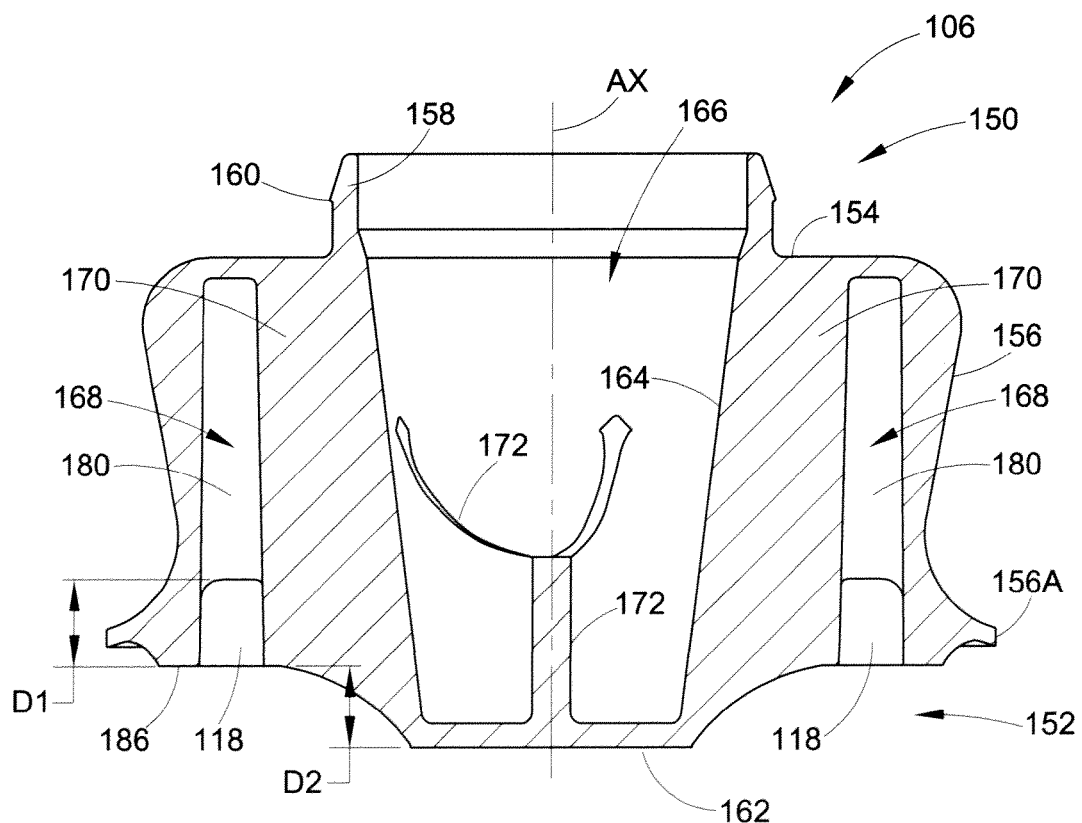
FIG. 8 is a cross-sectional side view of the exemplary end member in FIGS. 4-7 taken from along line 8-8 in FIG. 6.

In other situations, however, it is desirable to secure the gas spring assembly to the structural component without the use of fasteners or other securement elements that extend through (i.e., pass through an opening in) the structural component. Such external mounting or clamping arrangements may be employed for any one or more of a variety of reasons, such as space constraints and/or strength-related issues, for example. While it will be appreciated that any suitable external mounting or clamping arrangement may be used, one example of such an arrangement is shown and described in U.S. Pat. No. 6,945,548, which illustrates an air spring bracket (702) in FIG. 19 thereof and which is described therein at least column 14 from about lines 23-47, the disclosure of which is hereby incorporated herein by reference. A similar arrangement is shown in FIGS. 2 and 3 of the present disclosure that includes an exemplary bracket 110 extending around three sides of wheel-engaging member WEM with piston 106 being secured thereto by way of fasteners 112 (only one of which is shown) that interconnect bracket 110 and piston 104 to thereby secure the gas spring assembly on or along the structural component (e.g., wheel-engaging member WEM).

In accordance with one aspect of the subject disclosure, a cooperative mounting arrangement is provided in which an end member of a gas spring assembly and a corresponding vehicle component associated therewith interengage one another. In this way, the aforementioned laterally-acting forces associated with the pinching action can be transferred from the end member to the corresponding structural component without undesirably effecting the gas spring assembly. And, it will be appreciated that a cooperative mounting arrangement in accordance with the subject matter of the present disclosure may find particular application and use in connection with external mounting or clamping arrangements that extend along the exterior of the wheel-engaging member (or other vehicle component) and are secured thereto without the use of elements (e.g., a fastener or other securement device) that extend through the wheel-engaging member (or other vehicle component).

It will be appreciated that any suitable configuration can be used to secure the opposing end members of the gas spring assembly to the vehicle components and thereby accommodate any laterally-extending forces urging the end members toward the open end of angle AG1, as discussed above. As one example, a cooperative mounting arrangement 114 can include a projection 116 (FIG. 3) extending from wheel-engaging member WEM and a recess or pocket 118 (FIG. 3) formed into an end member, such as piston 106, for example, of the gas spring assembly or another component operatively associated therewith, such as a spacer, for example. Such a cooperative mounting arrangement permits the end member of the gas spring assembly and the wheel-engaging member (or other vehicle component) to interengage one another and thereby maintain the position of the end member relative to the wheel-engaging member (or other vehicle component) under any laterally acting forces, such as may be generated by the above-discussed compressing or pinching action of the vehicle components, for example.

Suspension system 100 can also optionally include a pressurized gas supply system 120 that is operatively associated with the gas spring assemblies for selectively supplying pressurized gas (e.g., air) thereto and selectively transferring pressurized gas therefrom. In the exemplary embodiment shown in FIG. 1, gas supply system 120 includes a pressurized gas source, such as a compressor 122, for example, for generating pressurized air or other gases. The gas supply system can also include any number of one or more control devices of any suitable type, kind and/or construction that may be capable of affecting the selective transfer of pressurized gas. For example, a valve assembly 124 is shown as being in communication with compressor 122 and can be of any suitable configuration or arrangement. In the exemplary embodiment shown, valve assembly 124 includes a valve block 126 with a plurality of valves 128 supported thereon. Valve assembly 124 can also optionally include a suitable exhaust, such as a muffler 130, for example, for venting pressurized gas from the system. Optionally, pressurized gas supply system 120 can also include a reservoir 132 in fluid communication with valve assembly 124 and suitable for storing pressurized gas.

The one or more control devices, such as valve assembly 124, for example, can be in communication with gas spring assemblies 102 in any suitable manner, such as, for example, through suitable fluid transmission lines 134. As such, pressurized gas can be selectively transmitted to and/or from the gas springs through valve assembly 124, such as to alter or maintain vehicle height at one or more corners of the vehicle, for example.

Suspension system 100 also includes a control system 136 that is capable of communication with any one or more other systems and/or components (not shown) of suspension system 100 and/or of which VHC and is capable of selective operation and control of the suspension system. Control system 136 includes a controller or electronic control unit (ECU) 138 in communication with compressor 122 and/or valve assembly 124, such as through a suitable conductor or lead (not shown), for example, for selective operation and control thereof, including supplying and exhausting pressurized fluid to and from gas spring assemblies 102. Additionally, it will be appreciated that controller 138 can be of any suitable type, kind and/or configuration.

Control system 136 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Turning now to FIG. 3, gas spring assembly 102 includes a central axis AX that extends longitudinally between the first end member (e.g., bead plate 104), which is disposed toward one end of axis AX, and the opposing second end member (e.g., piston 106), which is spaced from the first end member toward another end of axis AX. The first end member is disposed along a first or upper structural component FSC, such as a vehicle body or chassis, for example, and can be adapted for securement thereto in any suitable manner. For example, first structural component FSC is shown in FIG. 3 as including holes or openings OPN that are suitable for securement of the first end member to the first structural component. Gas spring assembly 102 is shown as including mounting studs 140 that project axially-outwardly from bead plate 104 and extend through openings OPN in the first structural component. Suitable fastening elements, such as threaded nuts (not shown), for example, can be used to secure bead plate 104 to first structural component FSC. It will be recognized that such a mounting arrangement will generally be sufficient to oppose any lateral loads or forces acting on the first end member (e.g., bead plate 104), such as the lateral forces represented by arrow AR3 in FIG. 2, for example.

The second end member is disposed along a second or lower structural component SSC, such as an axle or other wheel-engaging member, for example, and is adapted for securement on or along this second structural component. In one preferred arrangement, the second end member is adapted for securement to the second structural component by way of an external mounting bracket or other component or arrangement that does not rely upon the use of fasteners extending through the second structural component. One example of such an external mounting arrangement is shown in FIGS. 2 and 3 as bracket 110 and fasteners 112. However, it will be appreciated that any other suitable arrangement could alternately be used.

Additionally, at least one of the end members of a gas spring assembly and a corresponding one of the structural components associated therewith include a cooperative mounting arrangement (e.g., cooperative mounting arrangement 114) suitable for accommodating laterally-acting forces, such as have been previously describe, for example. In one preferred arrangement, such a cooperative mounting arrangement will be used in cases in which an external mounting bracket or other arrangement is employed that does not rely upon the use of fasteners that extend through openings in the associated structural component, such as the external mounting arrangement in FIGS. 2 and 3 using bracket 110 and fasteners 112, for example. It will be appreciated that the use of such a cooperative mounting arrangement can act to oppose any such laterally-acting forces, which may not be sufficiently accommodated by an external mounting arrangement acting alone.

As mentioned above, the opposing end members (e.g., bead plate 104 and piston 106) can be secured to the flexible wall (e.g., flexible sleeve 108) in any manner suitable for forming a substantially fluid-tight seal therewith such that a spring chamber 142 is at least partially defined therebetween. As one example, the flexible wall (e.g., flexible sleeve 108) is shown and described herein as being of an elongated sleeve-type configuration that is capable of forming a rolling lobe along the exterior of an end member (e.g., piston 104) of the gas spring assembly. However, it is to be understood that the subject matter of the present disclosure is capable of broad use in association with any suitable type, kind, and/or configuration of gas spring assembly.

Also, the flexible wall (e.g., flexible sleeve 108) can be secured between the first and second end members in any suitable manner. As shown in FIGS. 2 and 3, for example, flexible sleeve 108 extends between opposing ends 144 and 146. End 144 is shown as being an open end that is connected along bead plate 104 using a crimped arrangement to form a substantially fluid tight seal between the bead plate and the end of the flexible sleeve. End 146 of the flexible sleeve is received on a portion of piston 106 and is secured thereon by way of a snap-fit connection. Pressurized gas can be communicated into and out of spring chamber 142 in any suitable manner, such as, for example, through a passage 148 extending through one of mounting studs 140.

With reference, now, to FIGS. 3-8, piston 106 extends axially between opposing first and second ends, which are generally represented by reference numbers 150 and 152, respectively. First end 150 includes a first end wall 154 that is adapted to abuttingly engage flexible sleeve 108 and an outer side wall 156 that extends from along end wall 154 toward second end 152 of the piston. Outer side wall 156 is shown as having a curvilinear shape or configuration. However, it will be appreciated that any suitable size, shape and/or configuration could alternately be used, such as a frustoconical or a cylindrical shape, for example. In any case, outer side wall 156 will include a radially-outermost side wall portion that at least partially defines the outermost radial extent of the piston. In the exemplary embodiment shown in FIGS. 3-8, this radially-outmost side wall portion is identified by reference number 156A and will have an overall dimension (not shown) representing the maximum diameter or width of the radially-outermost side wall portion. An axially-extending annular wall 158 projects from along end wall 154 generally opposite the direction of outer side wall 156 and can be dimensioned to cooperatively receive an open end (e.g., second end 146) of the flexible wall associated therewith. A radially outwardly-extending projection or lip 160 is shown as being disposed along annular wall 158 and can operate to at least partially maintain second end 146 on annular wall 158. It will be appreciated, however, that any suitable configuration and/or arrangement can alternately be used for securement of the flexible wall on or along the piston and, thus, that annular wall 158 and lip 160 are optional.

Piston 106 also includes a second end wall 162 that is disposed along second end 152 and adapted to cooperatively engage second structural component SSC. In the exemplary case shown, second end wall 162 is approximately planar and adapted to abuttingly engage second structural component SSC. Piston 106 further includes an inner side wall 164 that at least partially defines an inner cavity 166. In the exemplary arrangement shown, inner side wall 164 extends in an approximately longitudinal direction and generally between first and second end walls 154 and 162. Inner side wall 164 is disposed in radially inwardly-spaced relation to outer side wall 156 such that an outer cavity 168 is formed therebetween. A plurality of outwardly-extending support walls 170 extend between the inner and outer side walls and thereby structurally interconnect the same. Additionally, a plurality of inner support walls 172 can optionally be included within inner cavity 166, such as, for example, along second end wall 162 and extending generally between different portions of inner side wall 164. Support walls 170 can be of any suitable quantity, configuration and/or arrangement and can extend along any portion of the longitudinal length of piston 106. In one exemplary case, outer support walls 170 extend radially-outwardly from inner side wall 164 and along approximately the entire longitudinal length of outer side wall 156 such that outer cavity 168 is separated into a plurality of individual chambers (not numbered). However, it will be understood that any other number, arrangement and/or configuration of inner support walls 172 and/or outer support walls 170 can alternately be used.

Piston 106 also includes at least one securement feature suitable for at least partially securing the piston on or along the corresponding structural component. In the exemplary arrangement shown, piston 106 includes a plurality of passages 174 that extend through the piston and are suitable for receiving at least a portion of a fastener, such as fastener 112, for example. Mating fastener components, such as threaded nuts (not shown), for example, could be received within a portion of passages 174 or, alternatively, mating threads (not shown) could be provided within the passage, either directly in the piston material or in the form of threaded inserts (not shown) embedded within the piston. It will be appreciated, however, that any other suitable arrangement could alternately be used, such as the use of mounting studs (not shown) projecting from the piston, for example.

As discussed above, piston 106 includes at least one mounting feature adapted to cooperatively engage a corresponding mounting feature on an associated structural component such that the interengagement of the cooperative mounting features can act to withstand, overcome or otherwise accommodate laterally-acting loads or forces that may be applied to the piston. As is further illustrated in FIGS. 5 and 6, piston 106 includes a recess 118 dimensioned to cooperatively receive a corresponding projection 116 (FIG. 3) formed, installed or otherwise provided on or along second structural component SSC with the recess and projection together forming cooperative mounting arrangement 114. Additionally, any number of one or more recesses, such as recesses 118, for example, can be used. As illustrated in the accompanying drawing figures, two recess disposed circumferentially opposite one another (i.e., about 180 degrees apart) are provided on piston 106 and permit the same to be mounted in either of two rotational orientations. However, it is to be understood that any number of one or more cooperative mounting arrangements or portions thereof can be used (e.g., one projection with two or more cooperative recesses).

Recesses 118 can be provided on piston 106 in any suitable manner and using any suitable configuration and/or arrangement of structural elements and features to at least partially define the recess. In the exemplary arrangement shown, recess 118 is positioned in between outer and inner side walls 156 and 164 such that forces and/or loads transferred to piston 106 by way of the recess are not directly applied to either of the inner or outer side walls, which is a preferred arrangement. Thus, in such a preferred arrangement, projection 116 will not directly abuttingly engage either of the inner side wall or the outer side wall. Rather, recess 118 can be established by one or more recess walls extending between adjacent ones of the outer support walls, which are identified in FIGS. 5 and 6 by reference numbers 170A. It will be appreciated that the one or more recess walls that at least partially define the one or more recesses of the end member can be of any suitable size, shape, construction, configuration and/or arrangement. In the exemplary arrangement shown, the recesses are at least partially defined by inner and outer recess walls 176 and 178, respectively, with the inner recess wall being approximately straight and the outer recess wall being somewhat curved.

A piston in accordance with the subject matter of the present disclosure (e.g., piston 106) can optionally include one or more support walls or ribs extending between two of the recess walls and/or between one of the recess walls and another wall of the piston. It will be appreciated that such optional support ribs can act to buttress the recess walls and, thus, can result in a more robust recess that may be capable of increased performance (e.g., load carrying capacity). In the present exemplary arrangement, piston 106 includes a plurality of recess support ribs 180 extending between inner and outer recess walls 176 and 178. Additionally, piston 106 is shown as including an inner support rib 182 extending between inner recess wall 176 and inner side wall 164. Piston 106 is also shown as including a plurality of outer support ribs 184 extending between outer recess wall 178 and outer side wall 156. It is to be understood, however, that the arrangement of support ribs shown and described herein is merely exemplary and that any other number, arrangement, configuration and/or construction of support ribs can alternately be used.

The embodiment in FIGS. 2-8 includes an arrangement in which a component (e.g., piston 106) of a gas spring assembly is supported directly on an associated structural component (e.g., second structural component SSC). It will be recognized, however, that in some cases it may be desirable for a gas spring assembly to be supported in spaced relation to an associated structural component. In such cases, a spacer may be used that is secured between an end member of the gas spring assembly and the associated structural component. One example of a known spacer is shown and described in U.S. Pat. No. 6,945,548, as has been discussed above.

In accordance with the subject matter of the present disclosure, a spacer for use in association with a gas spring assembly utilizes a cooperative mounting arrangement to interengage an associated structural component and thereby withstand, overcome or otherwise accommodate laterally-acting loads or forces that may be applied to a corresponding end member of an associated gas spring assembly that is supported on the spacer. One exemplary embodiment of such a spacer 200 is illustrated in FIGS. 9-12 and includes a cooperative mounting arrangement 202. The cooperative mounting arrangement includes a projection 204 extending from an associated structural component ASC and a recess 206 formed into spacer 200 that cooperatively receives projection 204, such as has been described above with regard to cooperative mounting arrangement 114, for example. It will be appreciated that associated structural component ASC is representative of any suitable element or structure with which a gas spring assembly might be used, such as that of a vehicle (e.g., wheel-engaging member WEM) or a piece of industrial equipment, for example. However, it will also be appreciated that a gas spring spacer in accordance with the subject matter of the present disclosure will find particular application and use with external mounting arrangements that do not rely upon the use of fasteners that extend through openings in the associated structural component. One example of such an external mounting arrangement has been discussed above with regard to bracket 110 and fasteners 112 in FIGS. 2 and 3, for example.

Figure 9:
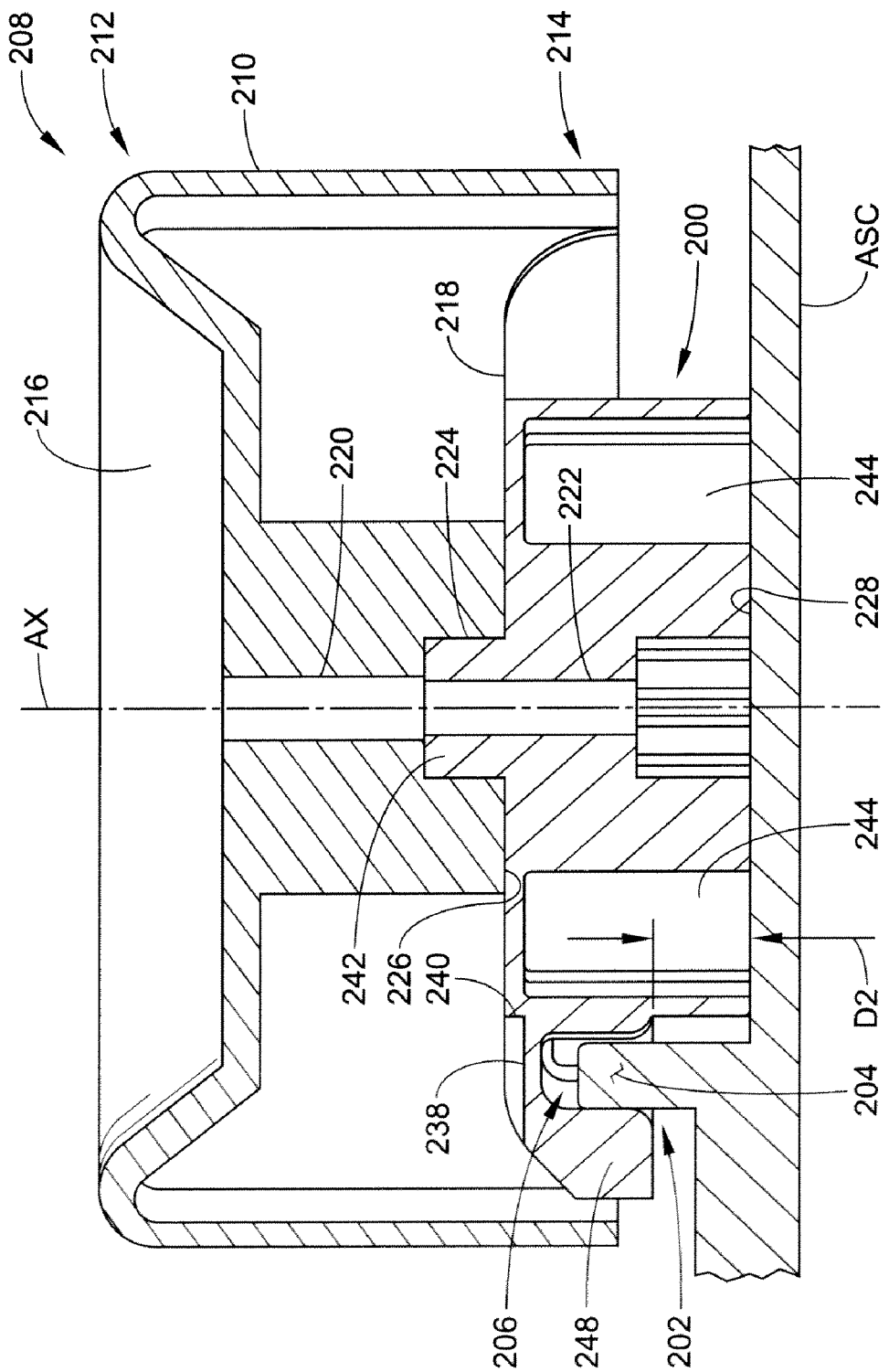
FIG. 9 is a side view of an alternate embodiment of a gas spring assembly operatively connected to a vehicle structure using an exemplary spacer that includes a cooperative mounting arrangement in accordance with the subject matter of the present disclosure.
Figure 10:
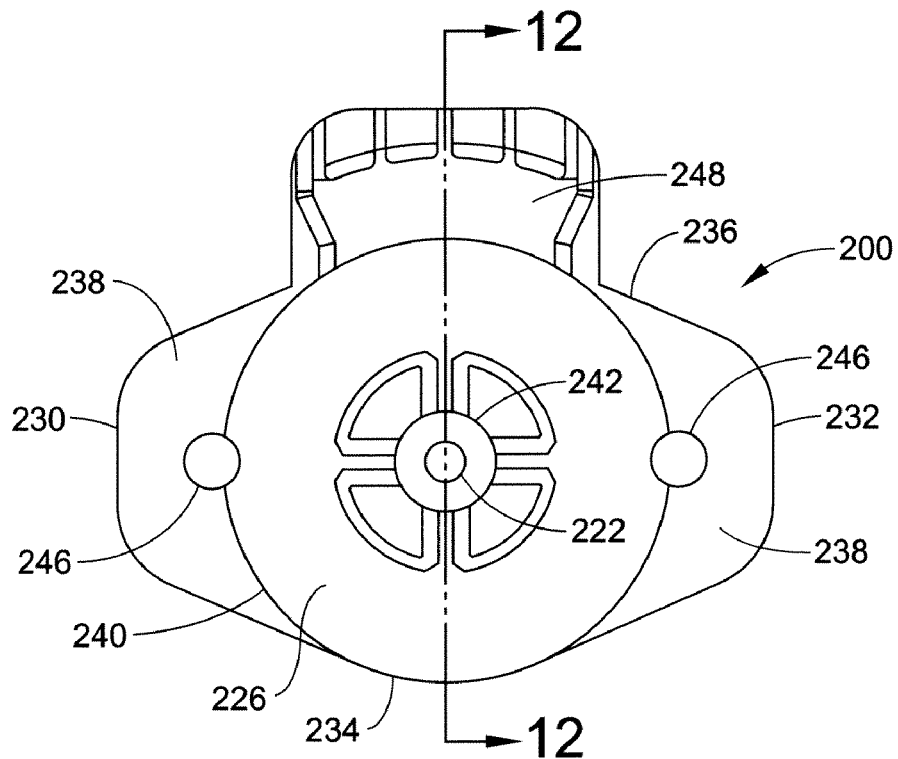
FIG. 10 is a top view of the exemplary spacer in FIG. 9.
Figure 11:
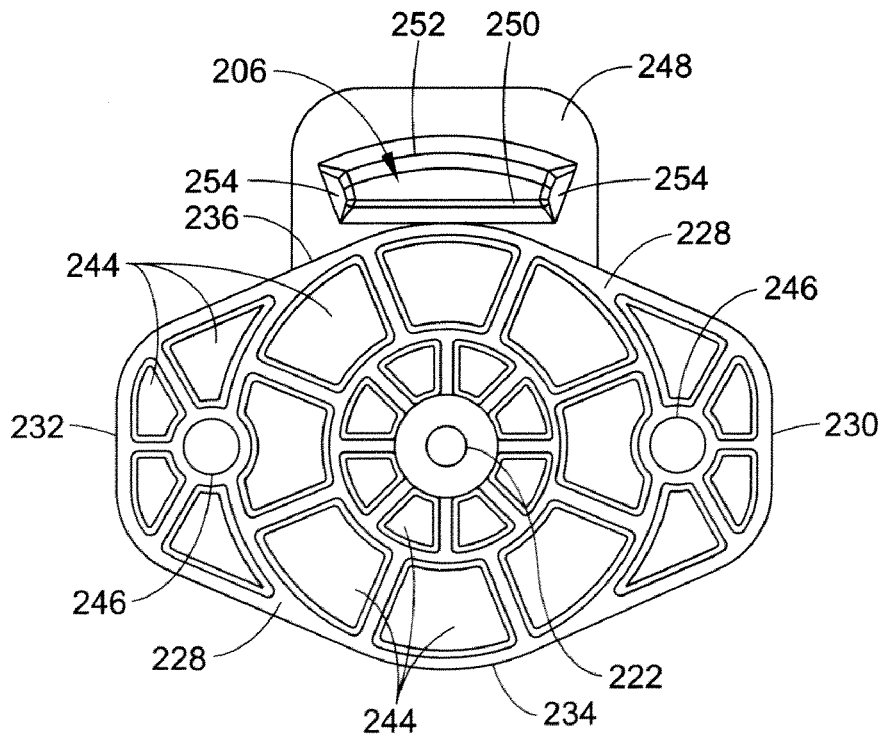
FIG. 11 is a bottom view of the exemplary spacer in FIGS. 9 and 10.
Figure 12:
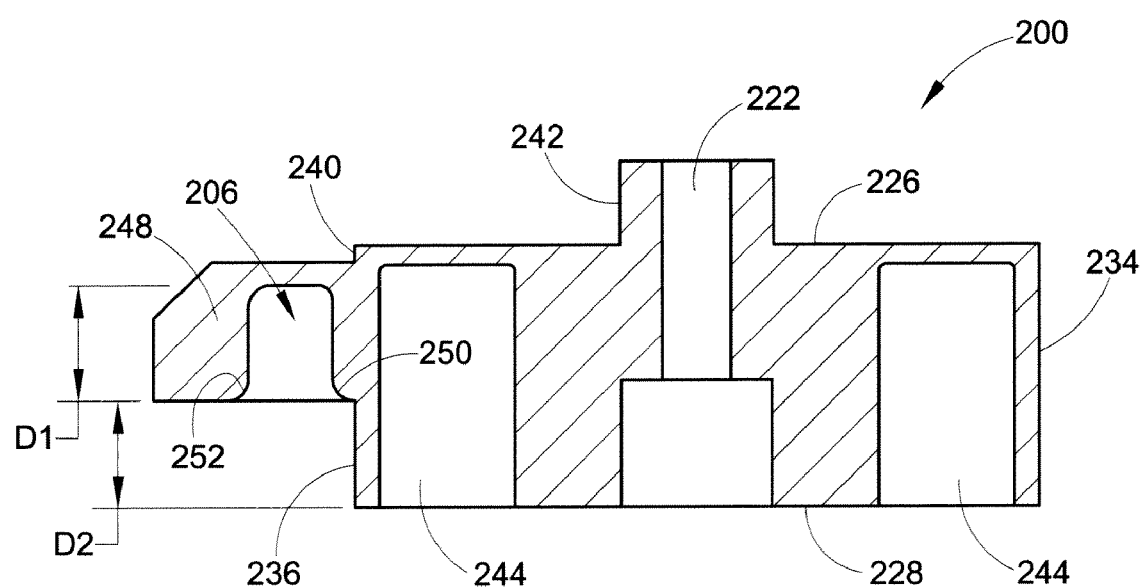
FIG. 12 is a cross-sectional side view of the exemplary spacer in FIGS. 9-11 taken from along line 12-12 in FIG. 10.

As discussed above, spacer 200 is adapted for use in operative association with a corresponding end member of an associated gas spring assembly. One exemplary end member is shown in FIG. 9 as a piston 208, which is suitable for operative connection with an associated flexible wall (not shown) of the associated gas spring assembly, such as has been discussed above, for example. Piston 208 includes a longitudinally-extending central axis AX and an outer side wall 210 that extends generally longitudinally between opposing first and second piston ends 212 and 214. Piston 208 includes an upper end wall 216 adapted to abuttingly engage an associated flexible wall (not shown), as is well know by those of skill in the art. Piston 208 also includes a lower end wall 218 that is axially spaced from upper end wall 216 and adapted to abuttingly engage a corresponding end wall of a gas spring spacer, such as spacer 200, for example.

With further reference to FIGS. 9-12, a spacer in accordance with the subject matter of the present disclosure can operatively interengage a corresponding end member of an associated gas spring assembly in any suitable manner for transmitting any laterally-acting forces or loads from the end member to the spacer. As such, a connection including one or more fasteners (not shown) extending therebetween could optionally be used. For example, passages 220 and 222 are, respectively, shown extending through the piston and spacer and could receive a threaded fastener for securing an end closure (not shown) of the flexible wall, the piston and the spacer together. In one exemplary embodiment, a cavity 224 can optionally be provided that extends into piston 208 from along lower end wall 218 and is suitably dimensioned to receive a suitable feature or element provided on the spacer to assist in transmitting any such laterally acting forces or loads from the piston to the spacer.

Spacer 200 includes a first or upper end wall 226 and an opposing second or lower end wall 228 that is axially spaced from the first end wall. It will be appreciated that spacer 200 can be of any suitable size, shape and/or configuration. For example, it is often desirable for a spacer, such as spacer 200, for example, to have a relatively wide footprint to provide a stable foundation for supporting the end member of an associated gas spring assembly. As such, spacer 200 has a spacer body that extends in one direction between opposing sides 230 and 232 and in the opposing direction between sides 234 and 236, portions of which are shown as being angled relative to one another which gives the spacer a somewhat diamond-shaped outline. In one preferred arrangement, it will also be desirable to maintain the outermost peripheral extents of the spacer within an envelope that is approximately established by an outermost peripheral extent of an end member of an associated gas spring assembly. As shown in FIG. 9, spacer 200 is maintained within the periphery established by outer side wall 210 of piston 208 such that a reduced mounting envelope can be used and the potential for interference with other components can be reduced.

Second end wall 228 is shown as being substantially planar over the entire extent thereof, which may assist in providing a relatively wide foot print for mounting stability. First end wall 226, while also substantially planar, extends over only a portion of the spacer such that a third or intermediate end wall 238 extends across the reminder of spacer 200. Third end wall 238 is disposed in axially-spaced relation to first end wall 226 such that an intermediate side wall 240 is formed therebetween and extends circumferentially about at least a portion of first end wall 226. An optional pilot or boss 242 can project from first end wall 226 in a generally axial direction and, if provided, is preferably dimensioned for cooperatively interengaging cavity 224 in piston 208, such as has been discussed above. Additionally, it will be appreciated that the body of spacer 200 can be formed in any suitable manner and, as such, can optionally include one or more cavities 244 formed therein, such as may be useful for maintaining approximately uniform wall thickness during an injection molding process, for example.

Additionally, spacer 200 can also include one or features and/or elements that may be suitable for mounting or otherwise securing the spacer and/or corresponding end member on or along the associated structural component. In the exemplary arrangement shown in FIGS. 9-12, spacer 200 includes mounting holes 246 that extend therethrough and are suitable for receiving associated securement elements, such as a threaded fastener (not shown), for example. In one preferred embodiment, mounting holes 246 will be disposed in a complimentary arrangement with respect to corresponding securement features provided in the associated end member (e.g., passages 174 of piston 106) for attachment of the spacer and end member to the associated structural component (e.g., component ASC) using an external mounting arrangement that does not rely upon the use of fasteners that extend through openings in the associated structural component, such as the external mounting arrangement in FIGS. 2 and 3 using bracket 110 and fasteners 112, for example.

A spacer in accordance with the subject matter of the present disclosure, such as spacer 200, for example, will include a recess or pocket that is suitable for use in forming a cooperative mounting arrangement, such as arrangement 202, for example. As has been discussed above in detail, the cooperative mounting arrangement is suitable for withstanding, overcoming or otherwise at least partially accommodating a load or force acting laterally on an end member of an associated gas spring assembly. It will be appreciated that a recess of any suitable type, kind, configuration and/or construction can be provided on the spacer in any suitable manner. As one example, a recess similar to that formed into piston 106 (i.e., recess 118) could be formed into spacer 200, such as from along bottom surface 228 and/or within the periphery of side walls 230-236, for example. As another example, an extension can project from the spacer body with the recess formed into the extension. More specifically, recess 206, which is shown in and discussed with regard to FIGS. 9-12, can be formed into or otherwise along an extension wall 248 projecting outwardly beyond side wall 236 of spacer 200.

One or more recess walls can be provide to at least partially define a recess in the spacer (e.g., recess 206 in spacer 200) and that the one or more recess walls can be of any suitable size, shape, construction, configuration and/or arrangement.

In the exemplary arrangement shown, recess 206 is at least partially defined by inner and outer recess walls 250 and 252, respectively, with the inner recess wall being approximately straight and the outer recess wall having curved configuration. Additionally, recess end walls 254 can optionally extend between the inner and outer recess walls and thereby form the periphery of recess 206. Furthermore, one or more ribs (not shown), such as ribs 180-184 of piston 106, for example, can extend to, from and/or between inner and outer recess walls 250 and/or 252 to structurally interconnect or otherwise support the same and thereby improve the performance and/or robustness of recess 206.

A recess in accordance with the subject matter of the present disclosure can be of any size, shape and/or configuration, but is preferably dimensioned to receive and cooperatively engage a corresponding projection, as has been discussed above in detail. Additionally, such a recess (e.g., recesses 118 and 206) can be of any suitable depth dimension, such as is represented by reference dimension D1 in FIGS. 8, 9 and 12, for example. Furthermore, such a recess can be established directly from a lower or bottom wall (e.g., walls 162 and 228) of the piston or spacer. Or, alternately, such a recess can begin from a wall or surface disposed in spaced relation to the lower or bottom wall, such as is represented by reference dimension D2 in FIGS. 8, 9 and 12, for example.

What's more, it will be appreciated that one or more of the walls, ribs and/or other features that form or otherwise at least partially define a recess (e.g., recesses 118 and 206) can optionally be of a more robust construction than other walls of the component. That is, a component, such as piston 106 and/or spacer 200, for example, could be molded from a suitable material, such as a fiber reinforced thermoplastic, for example, with a majority of the walls thereof having approximately the same nominal wall thickness, as is commonly practiced in the injection molding art. To increase the performance and load transferring capability of a recess formed in the component, however, one or more of the walls and/or ribs defining or otherwise related to the recess (e.g., recesses 118 and 206) can optionally have a wall thickness of from about 150 percent to about 300 percent (or greater) in comparison to that of the nominal wall thickness of the other walls and/or feature of the component. As a more specific example, walls forming piston 106 (e.g., first end wall 154, outer side wall 156, second end wall 162, inner side wall 164, and support walls 170 and 172) can have a nominal wall thickness of from about 0.010 inches to about 0.015 inches, for example. Whereas, walls, ribs and/or other features that at least partially form recess 118, such as inner and outer recess walls 176-178 and/or one or more of ribs 180-184, for example, can optionally have an increased nominal wall thickness, such as from about 0.015 inches to about 0.035 inches, for example. Thus, in one preferred embodiment, one or more of the walls, ribs and/or other features forming or otherwise at least partially defining a recess, such as recess 118 and 206, for example, will have a nominal wall thickness that is at least 50 percent greater than the nominal wall thickness of a majority of the other walls forming the component, such as piston 204 and spacer 200, respectively, for example.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A piston for use in forming an associated gas spring assembly and adapted to engage an associated projection of an associated structural support member, said piston comprising:
   a first end including a first end wall adapted to engage an associated flexible sleeve of the associated gas spring assembly;
   an opposing second end including a second end wall adapted to abuttingly engage the associated structural support member, said second end disposed in longitudinally-spaced relation to said first end such that a central axis extends therebetween;
   an outer side wall extending at least partially between said first and second ends and suitable for rolling of the associated flexible sleeve therealong;
   an inner side wall disposed in radially-inward spaced relation to said outer side wall such that a chamber is at least partially defined therebetween;
   first and second support walls extending from said inner side wall to said outer side wall such that said chamber is at least partially segmented by said first and second support walls; and,
   first and second recess walls positioned between said inner and outer side walls, said first and second recess walls extending between said first and second support walls and being radially spaced from one another to at least partially define a recess adapted to receive the associated projection of the associated structural support member such that lateral loads acting on said piston can be transferred to the associated projection, and further comprising one or more support ribs connecting said second recess wall and said outer side wall.

2. A piston according to claim 1, wherein said chamber has an open end formed toward said second end, and said recess is at least partially disposed within said chamber and accessible from along said open end.

3. A piston according to claim 1 further comprising one or more support ribs connecting said inner side wall and said first recess wall.

4. A piston according to claim 1 further comprising one or more support ribs connecting said first and second recess walls.

5. A piston according to claim 1, wherein said inner and outer side walls have a first nominal thickness and at least one of said first and second recess walls has a second nominal thickness that is at least 50 percent greater than said first nominal thickness of said inner and outer side walls.

6. A piston according to claim 5, wherein said first nominal thickness is within a range of from about 0.010 inch to about 0.015 inch and said second nominal thickness is within a range of from about 0.015 inch to about 0.035 inch.

7. A gas spring assembly adapted for use on an associated structural component having an associated projection for opposing laterally-acting loads, said gas spring assembly comprising:
 a first end member;
 a second end member spaced from said first end member and adapted for use in operative association along the associated structural component; and,
 a flexible wall secured between said first and second end members and at least partially defining a spring chamber therebetween;
 said second end member including:
  a first end wall and a second end wall disposed in spaced relation to one another such that a central axis is formed therebetween;
  an axially-extending outer wall including an outer wall surface for rolling of said flexible wall therealong;
  an axially-extending inner wall positioned radially-inwardly from said outer wall such that a cavity is formed therebetween;
  two or more radially-extending support walls connected between said inner and outer walls; and,
  first and second recess walls extending between adjacent ones of said two or more support walls and at least partially defining a recess therebetween that is operative to receive the associated projection and thereby transfer lateral loads acting on said second end member to the associated structural component along which the associated projection is provided;
  wherein the first and second recess walls are spaced apart radially, a radially outer one of the first and second recess walls connected to the outer wall by at least one support rib.

8. A gas spring assembly according to claim 7, wherein said second end member includes at least two recesses disposed on circumferentially opposing sides of said second end member.

9. A gas spring assembly according to claim 7 further comprising an external mounting bracket adapted to secure said second end member on the associated structural component without the use of a fastener extending through a passage in the associated structural component.

10. A gas spring assembly according to claim 9, wherein said second end member includes at least two circumferentially-spaced passages adapted to receive a fastener to thereby interconnect said second end member and said external mounting bracket and thereby secure said second end member to the associated structural member with said recess receivingly engaging the associated projection.

11. A gas spring assembly according to claim 7, wherein said second end member includes at least one support rib extending between said first and second recess walls and operative to minimize lateral displacement of said first and second recess walls relative to one another under laterally-applied loads.

12. A spacer adapted to support an associated end member of an associated gas spring assembly in spaced relation to an associated structural component having an associated projection, said spacer comprising:
 a first side adapted to abuttingly interengage the associated end member such that lateral loads acting on the associated end member can be transferred to said spacer;
 an opposing second side adapted to abuttingly engage the associated structural component; and,
 a recess accessible from along said second side and adapted to cooperatively receive the associated projection for transferring laterally-acting loads from the associated end member to the associated structural component, and further comprising first and second recess walls disposed in laterally-spaced relation to one another and at least partially defining said recess therebetween, one of the recess walls being relatively straight and one of the recess walls being relatively curved.

13. A spacer according to claim 12, wherein the associated end member includes an associated cavity formed thereinto and said spacer further comprises a pilot projecting from along said first side and dimensioned for cooperative interengagement with an associated passage for interconnecting said spacer with the associated end member.

14. A spacer according to claim 12 further comprising one or more support ribs connecting said first and second recess walls.

15. A spacer adapted to support an associated end member of an associated gas spring assembly in spaced relation to an associated structural component having an associated projection, said spacer comprising:
 a first side adapted to abuttingly interengage the associated end member such that lateral loads acting on the associated end member can be transferred to said spacer;
 an opposing second side adapted to abuttingly engage the associated structural component; and,
 a recess accessible from along said second side and adapted to cooperatively receive the associated projection for transferring laterally-acting loads from the associated end member to the associated structural component, and further comprising a spacer body at least partially defined by a plurality of opposing side walls, and an extension projecting from said spacer body from along one of said side walls, said recess being formed into said extension in laterally-spaced relation to said spacer body and being accessible from along said second side thereof, wherein the recess is a blind recess.

16. A gas spring and spacer assembly for securement along an associated structural component having an associated projection extending therefrom, said gas spring and spacer assembly comprising:
 a first end member;
 a second end member disposed in longitudinally-spaced relation to said first end member and including a first surface facing away from said first end member;
 a flexible wall secured between said first and second end members and at least partially defining a spring chamber therebetween; and,
 a spacer including opposing first and second sides and a recess accessible from along said second side, said first side including a first surface adapted to abuttingly engage said first surface of said second end member, and said second side including a second surface adapted to abuttingly engage the associated structural component, said recess being operative to receive the associated projection and thereby transfer lateral loads acting on said second end member to the associated structural component along which the associated projection is provided;
 wherein the spacer includes first and second recess walls disposed in laterally-spaced relation to one another and at least partially defining said recess therebetween, one of the recess walls being relatively straight and one of the recess walls being relatively curved.

17. A gas spring and spacer assembly according to claim 16, wherein the second end member has an associated outermost peripheral extent with an associated maximum dimension and said spacer has a maximum dimension extending thereacross that is less than the associated maximum dimension of the second end member such that, in use, said spacer is maintained within the associated outermost peripheral extent of the second end member.

18. A gas spring and spacer assembly according to claim 16 further comprising an external mounting bracket adapted to secure said second end member on the associated structural component without the use of a fastener extending through a passage in the associated structural component.

19. A gas spring and spacer assembly according to claim 16 further comprising one or more support ribs connecting said first and second recess walls.

20. A gas spring and spacer assembly according to claim 16 further comprising a spacer body at least partially defined by a plurality of opposing side walls, and an extension projecting from said spacer body from along one of said side walls, said recess being formed into said extension in laterally-spaced relation to said spacer body and being accessible from along said second side thereof.

* * * * *